United States Patent [19]

Pitalo et al.

[11] Patent Number: 4,626,685

[45] Date of Patent: Dec. 2, 1986

[54] MULTISPECTRAL COLLIMATOR WITH BUILT-IN-TEST

[75] Inventors: Stephen K. Pitalo; Clarence J. Russnak; Wallace M. Anderson, all of Huntsville, Ala.

[73] Assignee: The Boeing Company, Seattle, Wash.

[21] Appl. No.: 537,854

[22] Filed: Sep. 30, 1983

[51] Int. Cl.[4] .............................................. G01J 1/00
[52] U.S. Cl. .................................... 250/341; 250/342; 250/347
[58] Field of Search ............... 250/330, 334, 341, 342, 250/347; 356/152

[56] References Cited

U.S. PATENT DOCUMENTS

| | | | |
|---|---|---|---|
| 3,350,562 | 10/1967 | Flint | 250/347 |
| 4,037,959 | 7/1977 | Bumgardner | 356/73 |
| 4,087,689 | 5/1978 | Asawa | 250/342 |
| 4,155,096 | 5/1979 | Thomas et al. | 356/152 |
| 4,349,838 | 9/1982 | Daniel | 356/152 |
| 4,422,758 | 12/1983 | Godfrey et al. | 250/341 |

Primary Examiner—Alfred E. Smith
Assistant Examiner—Richard Hanig
Attorney, Agent, or Firm—Edwin H. Crabtree

[57] ABSTRACT

A multispectral collimator for testing and verifying electro-optical and opto-mechanical parameters of a forward looking infrared receiver, laser receiver, laser transmitter and the like. The collimator having a plurality of sub-systems which can be readily repositioned to test different types of electro-optical systems of a unit under test.

18 Claims, 24 Drawing Figures

MULTISPECTRAL COLLIMATOR WITH BUILT-IN-TEST

BACKGROUND OF THE INVENTION

This invention relates to test equipment for civilian and military electro-optical equipment and more particularly but not by way of limitation to a multispectral collimator adapted for field environment and having the ability to perform measurements and create stimuli for forward looking infrared receivers, laser receivers, laser transmitters and the like.

Heretofore in order to test civilian and military electrooptical systems, specialized test equipment was required which was large, heavy, expensive and not suitable for field environment. Further, there was no type of test equipment that was multipurpose, thermally stable, multispectral, light in weight and compact in volume.

In U.S. Pat. Nos. 3,229,093 to Trautvetter, 3,857,042 to LaGrange et al, 3,943,360 to Parkin, 4,021,662 to Mimms 4,037,959 to Bumgardner, 4,087,689 to Asawa, 4,260,254 to Braun and 4,346,992 to Schwartz various types of laser measuring equipment, target simulators and boresight measuring equipment are disclosed. None of these prior art patents specifically point out the unique features and combination of sub-systems making up the subject invention as described herein.

SUMMARY OF THE INVENTION

The subject multispectral collimator provides means for measuring and creating stimuli for testing forward looking infrared receivers, laser receivers, laser transmitters and other types of units under test.

The subject invention includes subsystems which are readily repositioned by remote means to test different types of electro-optical equipment.

The multispectral collimator is multipurpose, thermally stable, multispectral, light in weight and compact in volume.

Further, the multispectral collimator insures a test system that is managable by civilian and military personnel and greatly reduces the amount of test equipment needed in a field environment.

The multispectral collimator includes a thermal source for presenting a thermal image to a forward looking infrared system in the unit under test. Further the thermal source is used in combination with a laser measurement tester which measures beam divergence, boresight, pulse width and energy output of a laser from the unit under test. Also, the multispectral collimator includes autocollimators for aligning the boresight of the thermal source with the unit under test and an angle insensitive alignment prism used for registering the pointing error of the laser measurement tester and autocollimators with respect to the boresight of the infrared thermal source. Further, the collimator includes a laser simulator used to simulate laser receivers and having a periscope mounted at an exit aperture of a simulator for translating a collimated beam to the unit under test. The alignment prism is also used to register the pointing error of the laser simulator.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
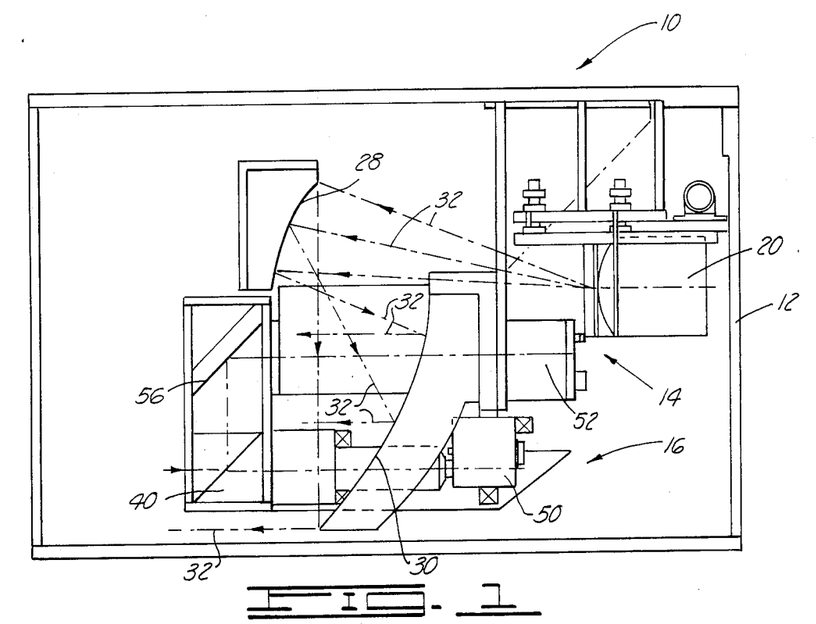
FIG. 1 illustrates a side view of the multispectral collimator with thermal image source and laser measurement tester.
Figure 2:
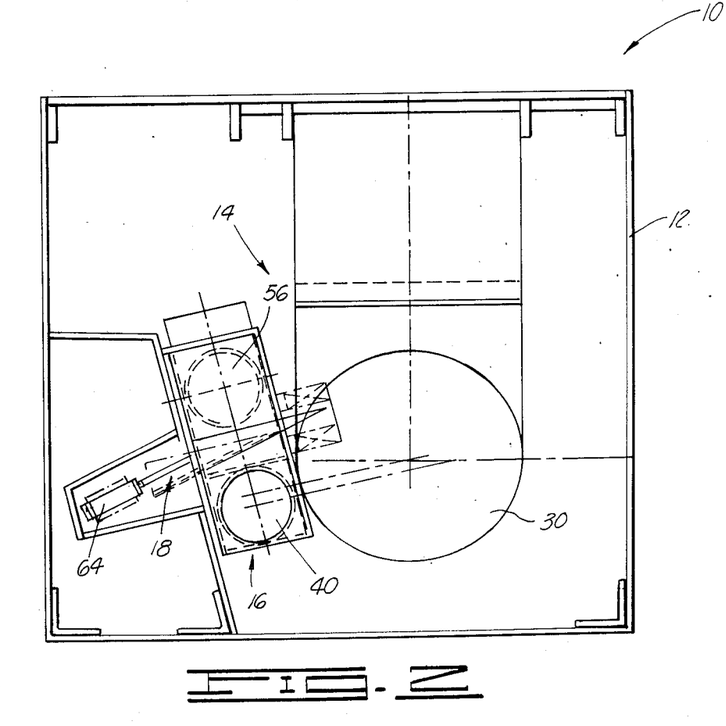
FIG. 2 is a front view of the multispectral collimator with thermal image source and laser measurement tester.

In FIG. 1 and FIG. 2 a side view and a front view of the multispectral collimator is shown in its basic form and designated by general reference numeral 10. The collimator 10 includes a housing 12 having a thermal image source 14 and a laser measurement tester 16 with wedge prism attenuator 18 mounted therein.

Figure 3:
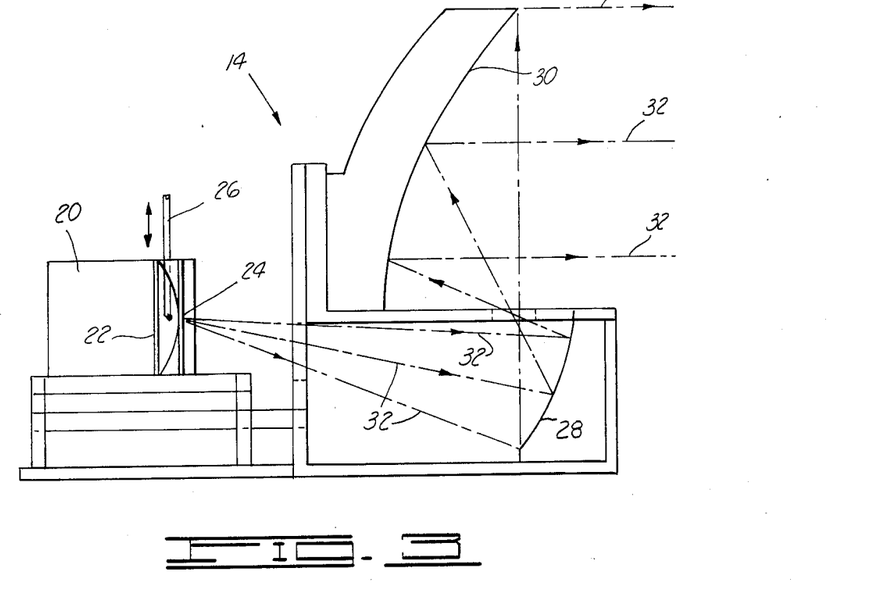
FIG. 3 is an enlarged side view of the thermal image source depicting a collimated thermal image from a boresight aperture of the image source.

Referring now to FIG. 3 which discloses the thermal image source 14 in greater detail, the source 14 can be seen including a thermal black body 20 with metal heat plate 22 and a thin metal target 24 consisting of a boresight aperture, modulation transfer function, bar patterns, a uniformity bar, gray scales and field of view corner marker members. An adjustable radiation source 26 is provided which may be a visable or a near infrared source and is adapted for receipt between the thin metal target 24 and the black body 20. The source 26 may be retracted when not in use by stepping motor system or solenoid. The stepping motor or solenoid is not shown in the drawings. The visible or near infrared source 26 irradiates the boresight aperture in the target 24 where it is collimated by a two-mirror aplanatized optic which includes a lower or secondary mirror 28 and an upper or primary mirror 30. The visible or near infrared image of the boresight aperture is depicted by arrows 32 extending outwardly from the boresight aperture in the target 24 and received on the face of the lower mirror 28 where it is reflected onto the upper mirror 30. In the far infrared use of the black body plate irradiates the whole target when the boresight aperture and the other pattern on the target are collimated by the two mirrors. The thermal image is depicted by the arrows 32 extending outwardly from the boresight aperture 24 received on the face of the lower mirror 28 where it is reflected onto the upper mirror 30 and outwardly to the forward looking infrared system of the unit under test. The whole thin metal target pattern is seen by the unit under test. The unit under test to be tested is not shown in the drawings.

Figure 4:
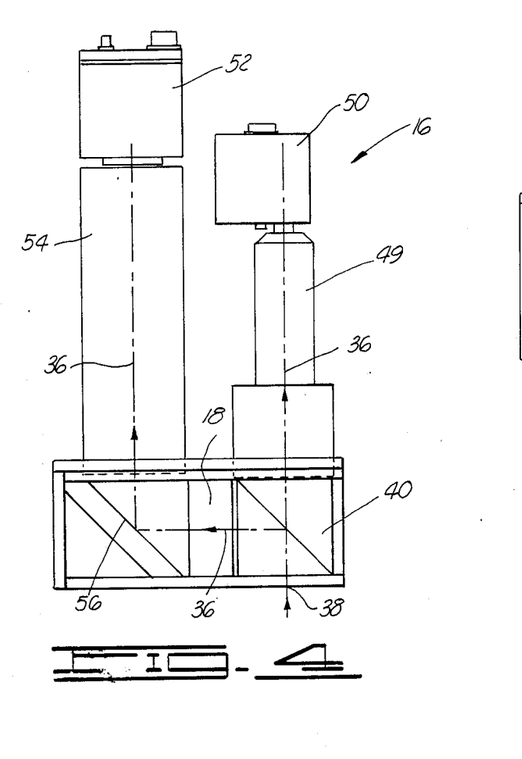
FIGS. 4 and 5 are a side view and front view of a laser measurement tester with wedge prism attenuator.
Figure 5:
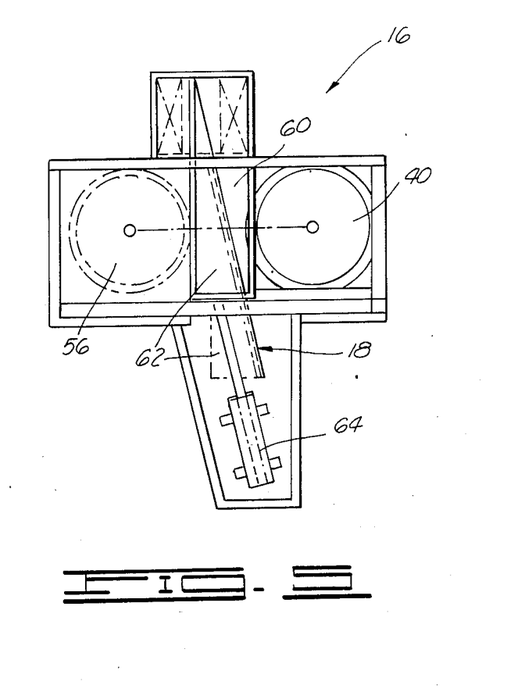

Referring now to FIGS. 4 and 5 a side view and a front view of the laser measurement tester 16 can be seen in greater detail. The laser measurement tester 16 is depicted receiving a laser beam indicated by arrow 36 from the unit under test and received through an entrance aperture 38 onto a cube beam splitter 40. The splitter 40 divides the beam 36 into approximately a 95% energy component or first portion and a 5% energy component or second portion. The first portion is transmitted through the splitter 40 where it enters a fast detector and calorimeter 50. The calorimeter 50 measures the power input of the beam 36 and the fast detector 50 measures the width of the pulse of the laser beam 36. The detector and calorimeter are combined in the same housing. An afocal lense system 49 is mounted in front of the detector 50.

The remaining 5% energy component or second portion is reflected 90° into the wedge prism attenuator 18 where the energy is reduced sufficiently to avoid saturating a matrix camera 52 which is part of a laser measuring instrument 54. When the reflected beam 36 is received through the attenuator 18, the beam is reflected off of a 45° mirror 56 into a telescope in the laser measuring instrument 54 which focuses the beam onto the matrix of the camera 52. The image of the beam 36 on the matrix is then seen in real time and stored in the computer memory of the laser measuring instrument 54.

Figure 6:
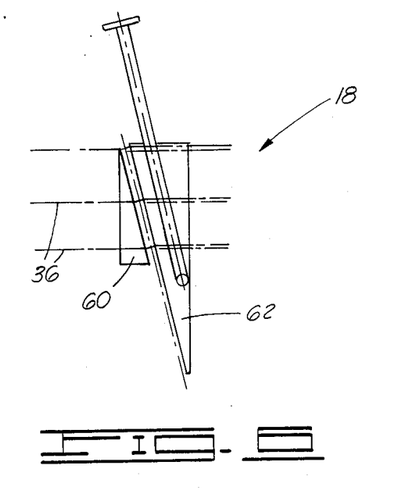
FIGS. 6 and 7 are a side view of the wedge prism attenuator in a maximum and minimum attenuation position.
Figure 7:
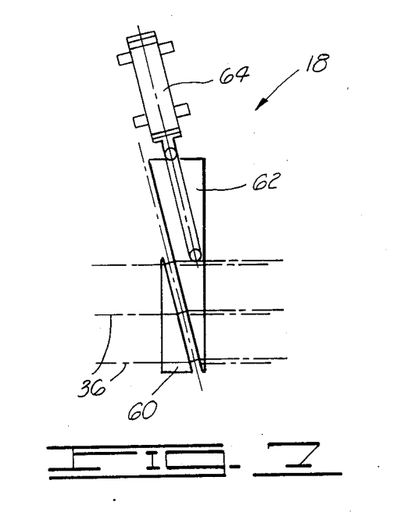

In FIGS. 6 and 7 a side view of the wedge prism attenuator 18 is shown with the attenuator 18 in a maximum attenuation position in FIG. 6 and minimum attenuation position in FIG. 7. The wedge prism attenuator 18 translates the beam 36 laterally but not angularly. The amount of translation of the beam 36 is a function of the air space between two wedge shaped prisms 60 and 62 and is not based on the thickness of the individual prisms 60 and 62. Prism 60 is stationary while prism 62 is adjustable by the use of a stepper motor 64.

Figure 8:
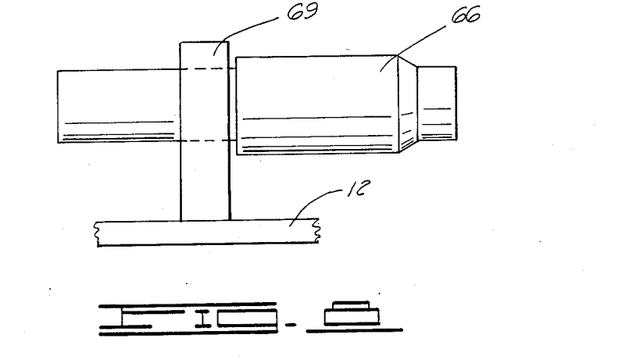
FIGS. 8, 9 and 10 are a side, top and end view of a pair of orthogonal autocollimators.
Figure 9:
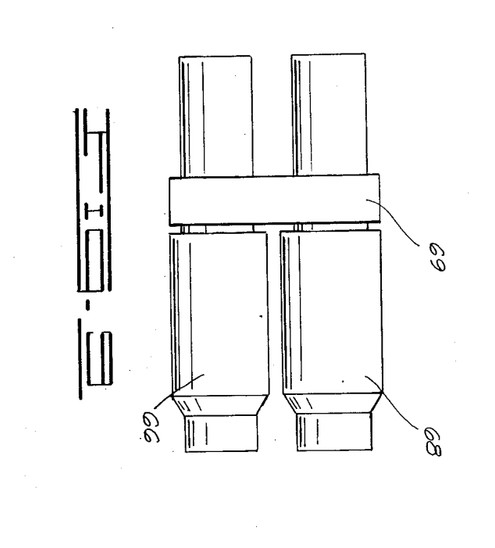
Figure 10:
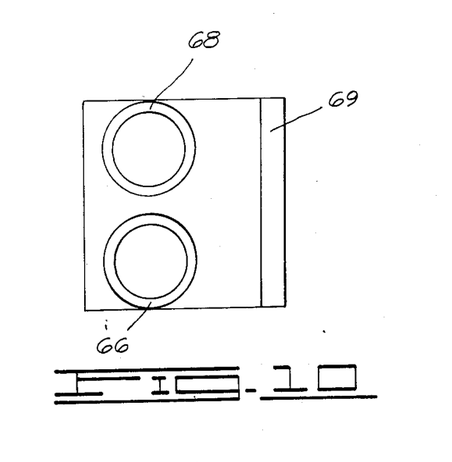

In FIGS. 8, 9 and 10 a side, top and end view of a pair of orthogonal autocollimators 66 and 68 mounted on a base 69 are shown. The autocollimators 66 and 68 are used in conjunction with an interface unit which is not shown in the drawings for holding the unit under test. The autocollimators 66 and 68 are used to align the unit under test to the collimator 10 by an alignment mirror mounted either on the interface unit or the unit under test. The autocollimators 66 and 68 are further aligned with the boresight aperture of the target 24 to determine any alignment error in the pitch axis and azimuth axis of the unit under test.

Figure 11:
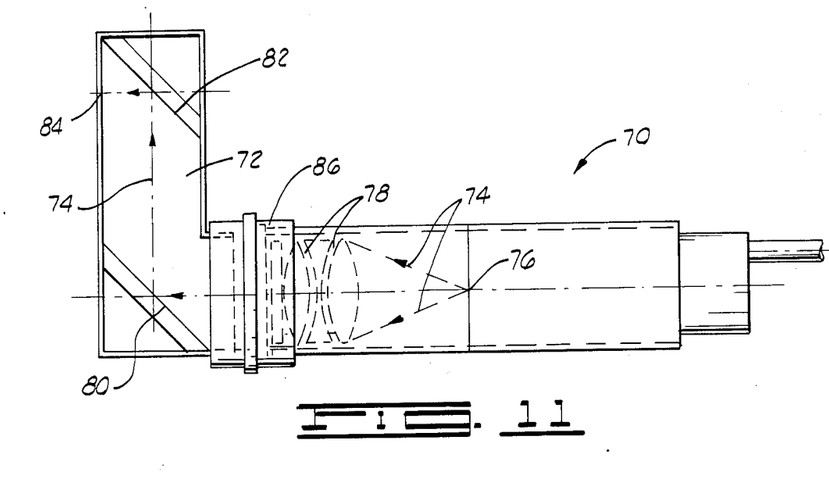
FIG. 11 is a side view of a laser simulator with multiposition periscope.
Figure 23:
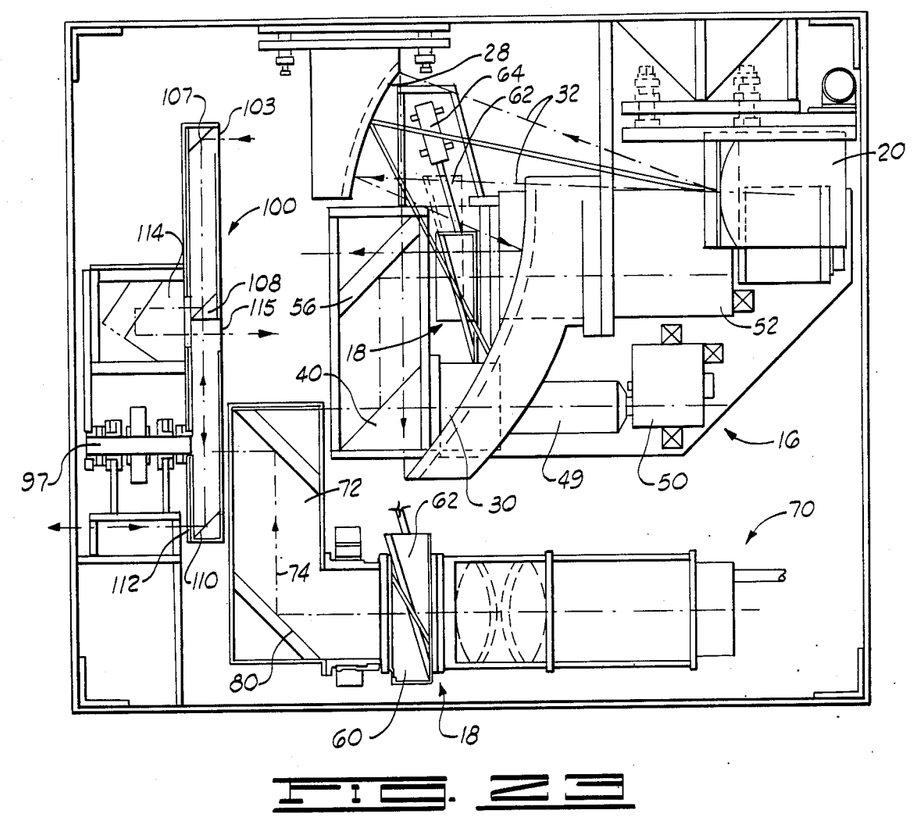
FIGS. 23 and 24 illustrate side and front views of a multi-spectral collimator with laser simulator, thermal image source, laser measurement and modified angle insensitive alignment prism.

In FIG. 11 a laser simulator 70 is illustrated with a multiposition periscope 72 attached thereto. The laser simulator 70 is shown with an outwardly extending beam depicted by arrow 74, the source of which irradiates from a focal plane 76 and then impinges an optics 78 where it is collimated and transmitted to the periscope 72. A pair of mirrors 80 and 82 translate the beam to a periscope exit aperture 84 without angularly misaligning the beam 74 regardless of the periscope alignment system 86 which rotates the periscope 72 into different aperture positions of the unit under test. The simulator 70 can be modified to have a variable intensity by inserting a wedge prism attenuator between the exit aperture of the simulator 70 and the periscope 72 as shown in FIG. 23.

Figure 12:
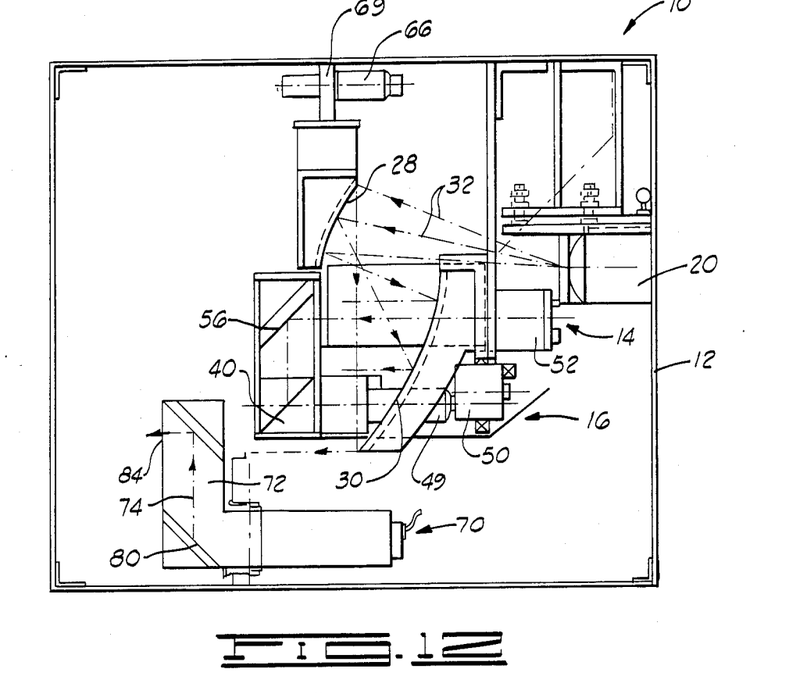
FIGS. 12 and 13 are side and front views of the multispectral collimator with autocollimator, laser simulator, thermal image source and laser measurement tester.
Figure 13:
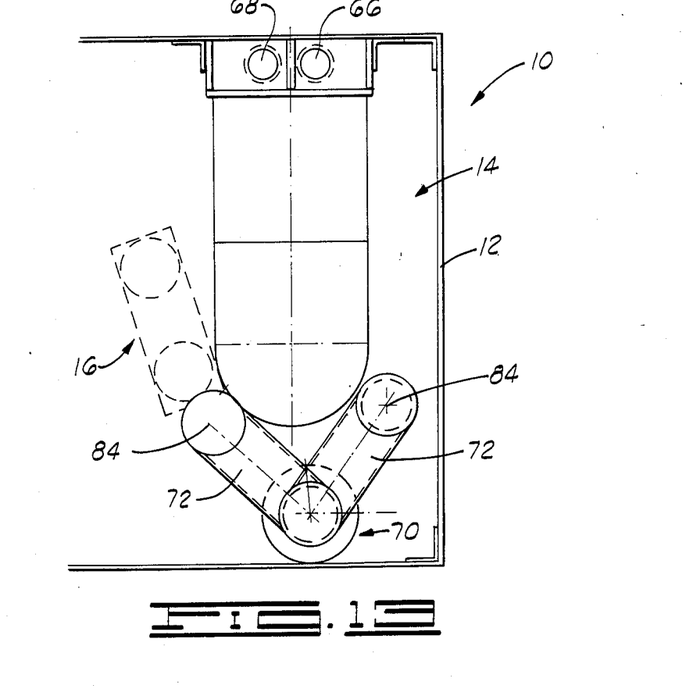

In FIGS. 12 and 13 a side and front view of the multispectral collimator 10 is shown with the autocollimators 66 and 68 mounted in top of the housing 12 along with the thermal image system 14, laser measurement tester 16 and the laser simulator 70 with multiposition periscope 72 shown in two different positions in FIG. 13.

Figure 14:
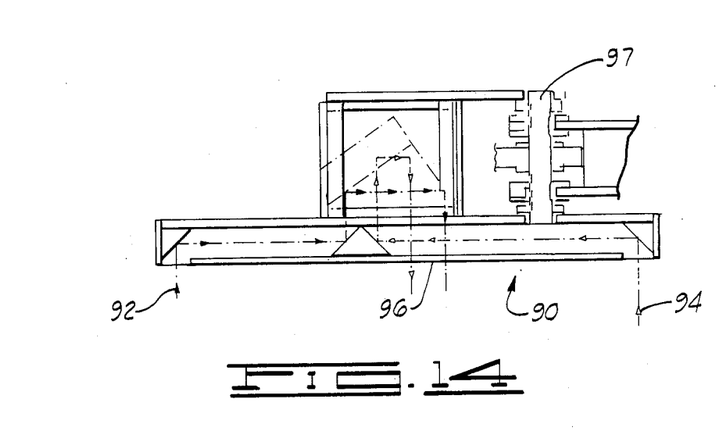
FIG. 14 is a side view of an angle insensitive alignment prism.

In FIG. 14 a built-in-test angle insensitive alignment prism 90 is shown which is used to perform built-in-test alignment. For example dark arrow 92 and light arrow 94 represent two separate collimated beams that the alignment prism 90 translates into a central aperture 96 adjacent to the laser measurement tester entrance aperture 38 where the laser measurement tester 16 compares the line of sight of one collimated beam to the other. The prism is rotated by a shaft 97 connected to pivot pin 98. The pin 98 is shown in FIG. 16.

Figure 15:
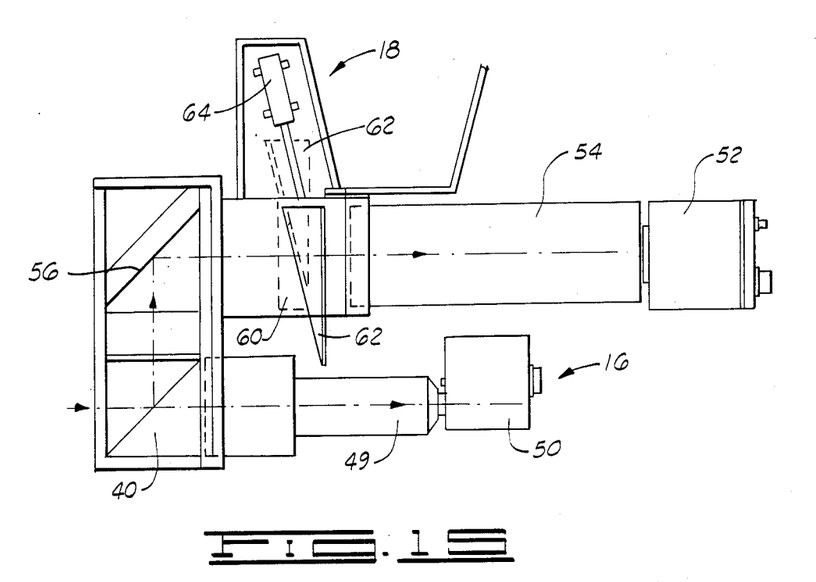
FIG. 15 is a reconfiguration side view of the laser measurement tester with wedge prism attenuator.

In FIG. 15 a reconfigured laser measurement tester 14 is shown with the wedge prism attenuator 18 removed from between the cube splitter 40 and the 45° angle mirror 56 and relocated between the mirror 56 and the entrance aperture of the laser measuring instrument 54. This reconfiguration is necessary if the autocollimators 66 and 68 are to be relocated as shown in FIG. 17 for providing built-in-test of the subsystems of the collimator 10.

Figure 16:
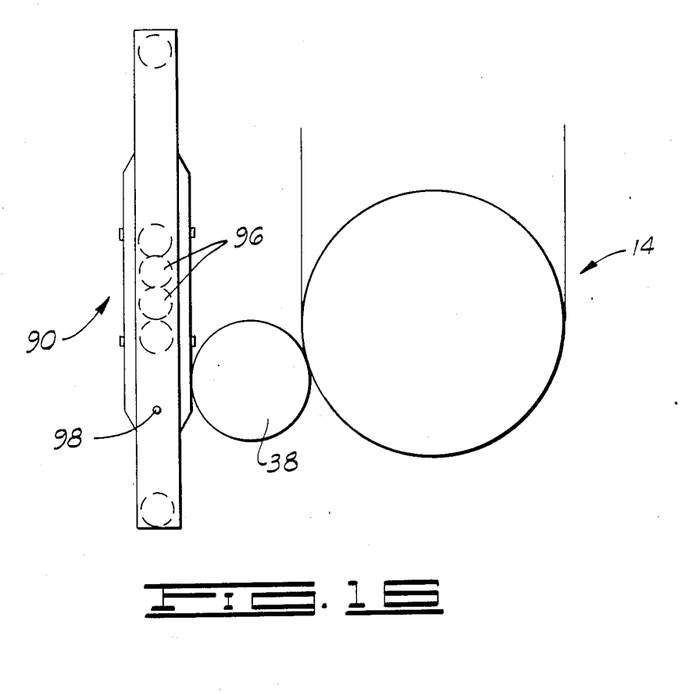
FIG. 16 illustrates the angle insensitive alignment prism in a stow position adjacent the laser measurement tester and thermal image source.

In FIG. 16 the prism 90 is shown in a stow position adjacent the laser measurement tester entrance aperture 38 and the exit aperture of the thermal image source 14. It should be noted that the prism 90 rotates about the pivot pin 98 for proper positioning in front of the subsystems of the collimator 10.

Figure 17:
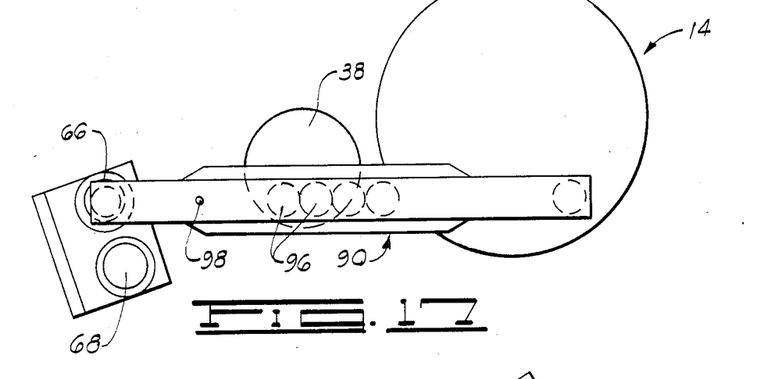
FIG. 17 illustrates the angle insensitive alignment prism positioned in the line of sight of the autocollimator with respect to the boresight of the thermal image source as registered by the laser measurement tester matrix camera.

In FIG. 17 the angle insensitive alignment prism 90 is shown positioned to measure the line of sight of one of the autocollimators with respect to the boresight reference of the thermal image source 14 as registered on the matrix of the laser measurement tester camera 52 of the tester 16. Both autocollimators line of sight are measured. The camera 52 is not shown in the drawing.

Figure 18:
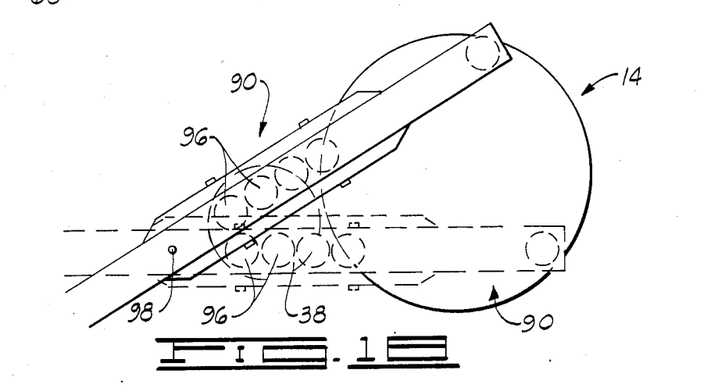
FIG. 18 illustrates the alignment prism positioned to determine the focus of the thermal image source and to register the boresight on the matrix camera.

In FIG. 18 the angle insensitive alignment prism 90 is shown in two different positions in front of the thermal image source 14. This is done to determine the focus of the source 14 and register the boresight on the camera 52 of the tester 16.

Figure 19:
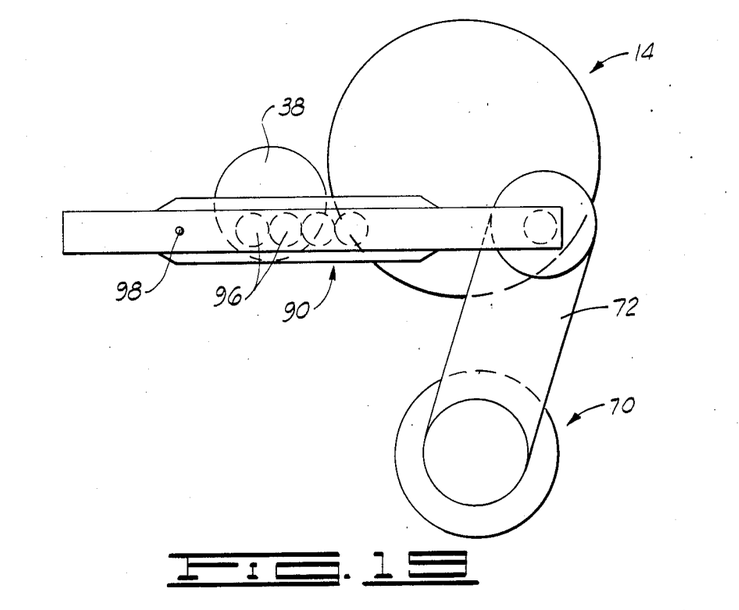
FIG. 19 illustrates the alignment prism positioned to measure the laser simulator lines of sight with respect to the boresight as registered by the matrix camera.

In FIG. 19 the laser simulator periscope 72 has been repositioned in front of the alignment prism 90. The angle insensitive prism 90 is repositioned in front of the periscope 72 to measure the laser simulator 70 line of sight with respect to the boresight reference to the thermal image source 14 as again registered on the matrix of the camera 52.

Figure 20:
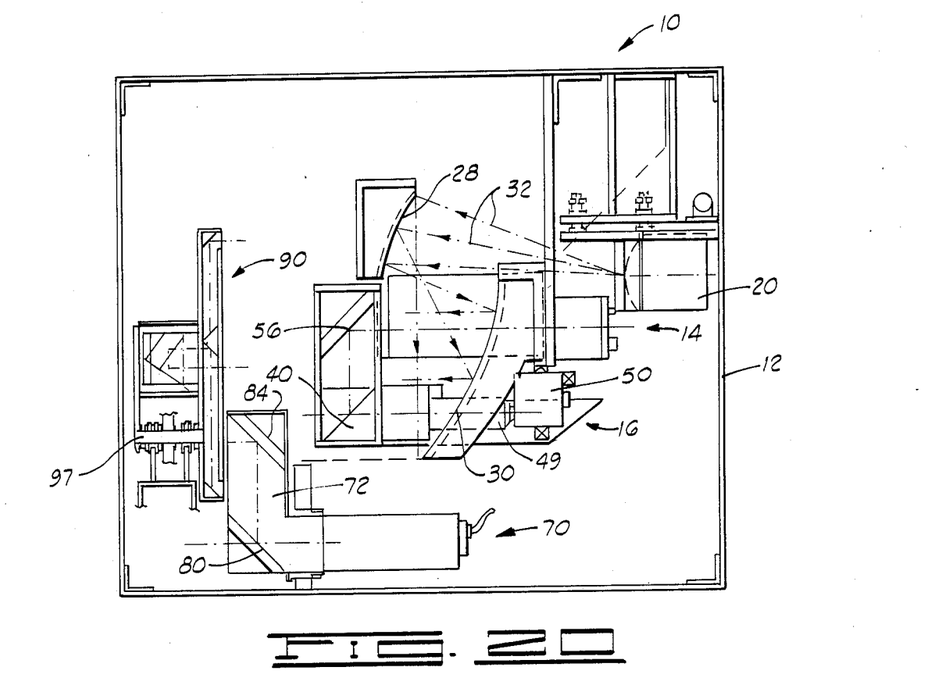
FIGS. 20 and 21 illustrate a side and front view of the collimator further including the built-in-test alignment prism.
Figure 21:
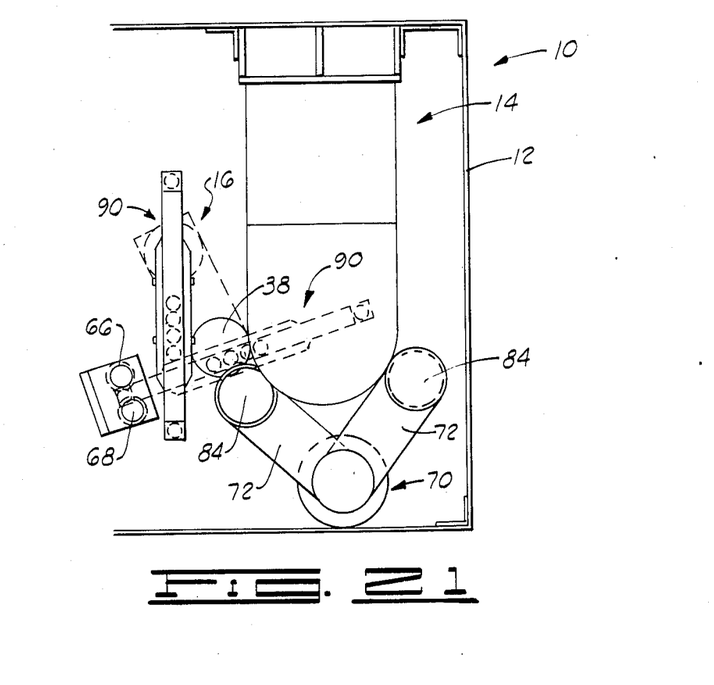

In FIGS. 20 and 21 a side and front view of the multispectral collimator 10, the autocollimator 66 and 68 and the thermal image source 14 are shown. It should be noted in FIG. 21 the alignment prism 90 can be seen in a stow position and in a position in front of the autocollimators 66 and 68. The laser measurement tester 16 receives the collimating beams from the thermal image source 14 and the autocollimators 66 and 68. The beams are translated to a central aperture in the prism 90 adjacent to the entrance aperture 38 of the laser measurement tester 16 for comparing the line of sight of one collimated beam to another on the matrix camera 52 in the laser measurement tester 16.

Figure 22:
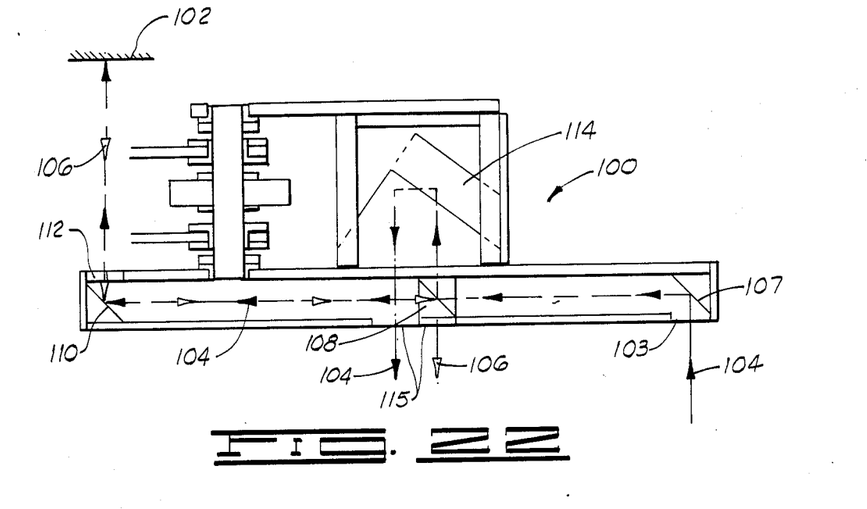
FIG. 22 illustrates a modified angle insensitive alignment prism mirror.

In FIG. 22 a modified angle insensitive alignment prism 100 is illustrated which eliminates the use of the autocollimators and is adapted for receiving a reflected collimated beam off of a reference mirror 102 on the unit under test and compares the collimated beam from the thermal image source systems visable or near infrared boresight aperture image in the target 24. The beam is shown as a dark arrow 104. A reflected beam from the reference mirror 102 is illustrated by a light arrow 106. The incident beam 104 received from the thermal source 14 is received through an entrance aperture on a 45° mirror 107 and through a cube beam splitter 108 where a portion of the beam 104 is received through the splitter 108 and reflected off a 45° mirror 110 and out an exit aperture 112 where it impinges on and is reflected off of the reference mirror 102. A second portion of the beam 104 is reflected off of the cube splitter 108 where it is received in a cube corner 114 where it is transmitted and reflected 180° and received outwardly from a second exit aperture 115. The reflected beam then enters the laser measurement tester entrance aperture 38. The laser measurement tester 16 then images both beams onto the matrix of the camera 52.

Figure 24:
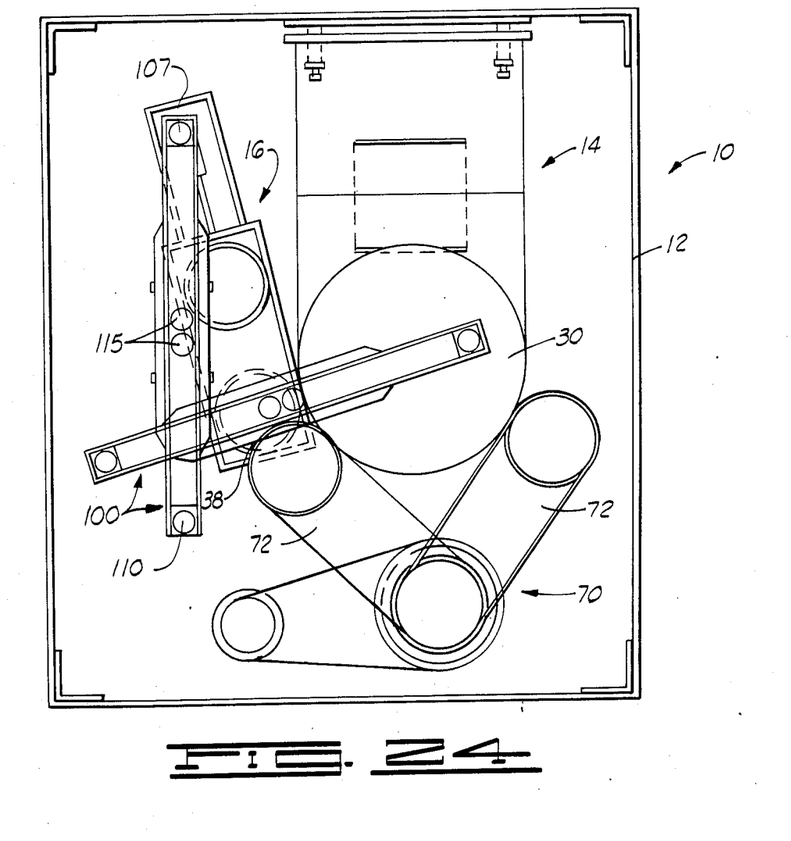

In FIGS. 23 and 24 the collimator 10 can be seen with the modified angle insensitive alignment prism system 100. In FIG. 23 the modified prism 100 can be seen in a stow position and then in a rotated position for receipt in front of the thermal image source 14, the laser measurement tester 16 and in an aperture position in front of the reference mirror 102 of the unit under test.

From reviewing the above discussion of the above mentioned drawings, it can be seen that the multispectral collimator 10 comprises various subsystems providing means for performing measurement and creating stimuli to test and verify the electrooptical and opto-mechanical parameters of various types of forward looking infrared receivers, laser receivers and laser transmitters.

Changes may be made in the construction and arrangement of the parts or elements of the embodiments as described herein without departing from the spirit or scope of the invention defined in the following claims.

What is claimed is:

1. A multispectral collimator for testing and verifying electro-optical and opto-mechanical parameters of a unit under test, the collimator comprising:
   a thermal image source for outputting a collimated infrared radiation image to the unit under test, the source including;
      a thermal black body with infrared target and boresight aperture therein; and
   a two-mirror aplanatized optic for receiving the image of the target and collimating the image to the unit under test;
   a laser measurement tester for receiving a laser beam from the unit under test, the tester including;
      a cube beam splitter for dividing the beam into a first portion and a second portion, the first portion received through the splitter, the second portion reflected from the splitter;
      a fast detector and calorimeter for receiving the first portion of the beam, the fast detector measuring the width of the laser beam pulse, the collimator measuring the power input of the laser beam; and
      a laser measuring instrument for receiving the reflected second portion of the beam, the laser measuring instrument having a matrix camera and computer therein where the beam is focused onto the matrix of the camera and stored in the memory of the computer.

2. The collimator as described in claim 1 wherein the source is a visible source which can be retracted when the thermal image source is in use.

3. The collimator as described in claim 1 wherein the source is a near infrared source which can be retracted when the thermal image source is in use.

4. The collimator as described in claim 1 wherein the first portion of the laser beam is greater than 90% of energy component of the laser beam and the second portion of the beam energy is less than 10% of the energy component of the laser beam.

5. The collimator as described in claim 1 further including a wedge prism attenuator disposed between the cube beam splitter and the laser measuring tester for reducing the laser beam energy focused onto the matrix of the camera and to prevent saturating the matrix camera.

6. The collimator as described in claim 5 wherein the wedge prism attenuator includes a pair or wedge shaped prisms adjustable for maximum and minimum attenuation and transmitting the attenuated beam to the laser measuring tester.

7. A multispectral collimator for testing and verifying electro-optical and opto-mechanical parameters of a unit under test, the collimator comprising:
   a thermal image source for outputting a collimated infrared radiation image to the unit under test, the source including:
      a thermal black body with infrared target and boresight aperture therein;
      an adjustable infrared source connected to the thermal black body; and
      a two-mirror aplanatized optic for receiving the image of the target and collimating the image to the unit under test;
   a laser measurement tester for receiving a laser beam from the unit under test, the tester including:
      a cube beam splitter for dividing the beam energy into a first portion and a second portion, the first portion being approximately 90% or greater of the beam energy which is received through the splitter;
      a fast detector and calorimeter for receiving the first portion of the beam, the calorimeter measuring the power input of the beam and the fast detector measuring the width of the laser beam pulse;

a wedge prism attenuator disposed adjacent the cube beam splitter for receiving the second portion of the beam energy being approximately 10% or less the wedge prism attenuator reducing the beam energy and translating the beam energy; and a laser measuring instrument having a matrix camera and computer therein, the matrix camera receiving the attenuated second portion and focusing thereon and storing in the computer memory.

8. A multispectral collimator for testing and verifying an electro-optical and opto-mechanical parameters of a unit under test, the collimator comprising:

a thermal image source for outputting a collimated infrared radiation image to the unit under test, the source including:

a thermal black body with infrared target and boresight aperture therein; and a two-mirror aplanatized optic for receiving the image of the target and collimating the image to the unit under test;

a laser measurement tester for receiving a laser beam from the unit under test, the tester including:

a cube beam splitter for dividing the beam energy into a first portion and a second portion, the first portion received through the beam splitter to a fast detector and calorimeter, the second portion reflected into a laser measuring instrument and focused onto a matrix camera; and an autocollimator aligned with the boresight aperture of the thermal image source and aligned with the unit under test.

9. The collimator as described in claim 8 wherein the autocollimator includes a pair of autocollimators aligned with the boresight aperture of the thermal source and adapted for alignment to an alignment mirror on the unit under test.

10. The collimator as described in claim 9 wherein the two autocollimators are adapted for aligning the azimuth axis and pitch axis of the unit under test with the boresight aperture of the thermal source.

11. A multispectral collimator for testing and verifying electro-optical and opto-mechanical parameters of a unit under test, the collimator comprising:

a thermal image source for outputting a collimated infrared radiation image to the unit under test, the source including;

a thermal black body with infrared target and boresight aperture therein; and a two-mirror aplanatized optic for receiving the image of the target and collimating the image to the unit under test;

a laser measurement tester for receiving a laser beam from the unit under test, the tester including;

a cube beam splitter for dividing the beam energy into a first portion and a second portion, the first portion received through the beam splitter to a fast detector and calorimeter, the second portion reflected into a laser measuring instrument and focused onto a matrix camera; and a laser simulator with periscope for outputting a laser beam from collimating optic in the simulator to the focal plane of the unit under test.

12. The collimator as described in claim 11 wherein the periscope is rotatable to different aperture positions on the unit under test.

13. The collimator as described in claim 11 further including a pair of autocollimators aligned with the boresight aperture of the thermal source and adapted for alignment to an alignment mirror on the unit under test.

14. The collimator as described in claim 13 further including an angle insensitive alignment prism rotatably mounted for receipt in front of a collimated beam from one of the autocollimators and in front of a collimated beam in front of the boresight aperture of the thermal image source and translating the two different collimated beams to a central aperture for comparing the line of sight of one collimated beam to another in the laser measurement tester.

15. The collimator as described in claim 11 further including an angle insensitive alignment prism rotatably mounted for receipt in front of a collimated beam from the boresight aperture of the thermal image source and in front of a collimated beam in front of the laser simulator and translating the two different collimated beams through a central aperture for comparing the line of sight of one collimated beam to another in the laser measurement tester.

16. The collimator as described in claim 11 further including an angle insensitive alignment mirror rotatably mounted for receipt in front of a collimated beam emitting from the boresight aperture of the thermal image source and in a different position in front of the same collimated beam of the boresight aperture of the thermal image source and transmitting the two different portions of the same collimated beam to a central aperture for comparing coincidence of the line of sight of both portions as registered on the matrix camera to determine the focus of the thermal image source.

17. The collimator as described in claim 11 further including an angle insensitive alignment prism rotatably mounted for receipt in front of a collimated beam from the boresight aperture of the thermal image source and in front of a collimated beam reflected from the unit under test and transmitting two portions of the same collimated beam to a central aperture adjacent the laser measurement tester for comparing the line of sight of one portion of the beam to another in the laser measurement tester.

18. The collimator as described in claim 11 further including a wedge prism attenuator disposed between the laser simulator and the periscope for reducing the laser beam energy focused onto the matrix of the camera.

* * * * *